US008705745B2

(12) United States Patent
Tian et al.

(10) Patent No.: US 8,705,745 B2
(45) Date of Patent: *Apr. 22, 2014

(54) METHOD AND SYSTEM FOR TRANSMITTING DEFERRED MEDIA INFORMATION IN AN IP MULTIMEDIA SUBSYSTEM

(75) Inventors: Tian Tian, Shenzhen (CN); Yunwen Zhu, Shenzhen (CN); Yinxing Wei, Shenzhen (CN); Zhimeng Teng, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 60 days.

This patent is subject to a terminal disclaimer.

(21) Appl. No.: 13/259,732

(22) PCT Filed: Mar. 22, 2010

(86) PCT No.: PCT/CN2010/071186
§ 371 (c)(1),
(2), (4) Date: Dec. 26, 2011

(87) PCT Pub. No.: WO2010/148672
PCT Pub. Date: Dec. 29, 2010

(65) Prior Publication Data
US 2012/0099729 A1    Apr. 26, 2012

(30) Foreign Application Priority Data

Jun. 26, 2009  (CN) .......................... 2009 1 0142257

(51) Int. Cl.
*G06F 21/00*        (2013.01)
(52) U.S. Cl.
USPC ................. 380/279; 726/26; 726/27; 380/44; 713/170

(58) Field of Classification Search
USPC ........................................................ 380/279
See application file for complete search history.

(56) References Cited

U.S. PATENT DOCUMENTS 7,765,599 B2 *   7/2010   Casas et al. .................... 726/26
8,447,038 B2 *   5/2013   Bauchot et al. ............... 380/278
(Continued)

FOREIGN PATENT DOCUMENTS

CN       101288257 A    10/2008
JP       2006253860 A   9/2006

OTHER PUBLICATIONS

International Search Report for International Application No. PCT/CN2010/071186 mailed Jul. 1, 2010.

*Primary Examiner* — Morshed Mehedi
(74) *Attorney, Agent, or Firm* — Pearl Cohen Zedek Latzer Baratz LLP

(57) ABSTRACT

A method for transmitting deferred media information in an Internet Protocol (IP) multimedia subsystem (IMS) includes: a sending party of the media information sends a key generation parameter encrypted with a Ka to a mailbox application server of a receiving party of the media information, the mailbox application server stores or saves the encrypted key generation parameters, and sends the encrypted key generation parameters to a key management server (KMS); the KMS generates a media key K and forwards it to the sending party through the mailbox application server of the receiving party; the receiving party obtains the encrypted key generation parameter from the mailbox application server and sends it to the KMS; the KMS generates the K and sends it to the receiving party; the receiving party decrypts the encrypted media information by using the K. A corresponding system is also disclosed. The method and system decrease signaling interaction between the sending party and the KMS, reduce the storage pressure of the KMS; realize the end-to-end secure transmission of the deferred media in the IMS.

15 Claims, 4 Drawing Sheets

(56) References Cited

U.S. PATENT DOCUMENTS

| | | | |
|---|---|---|---|
| 2001/0016836 A1* | 8/2001 | Boccon-Gibod et al. | 705/51 |
| 2003/0131236 A1* | 7/2003 | Sasmazel | 713/171 |
| 2005/0165771 A1* | 7/2005 | Go et al. | 707/3 |
| 2006/0288211 A1* | 12/2006 | Vargas et al. | 713/170 |
| 2007/0147600 A1* | 6/2007 | Stahlman et al. | 379/266.07 |
| 2008/0240433 A1* | 10/2008 | Fahn et al. | 380/255 |
| 2008/0240447 A1* | 10/2008 | Zhu et al. | 380/279 |
| 2009/0022324 A1* | 1/2009 | Inokuchi et al. | 380/279 |
| 2010/0150352 A1* | 6/2010 | Mansour et al. | 380/281 |
| 2011/0176675 A1* | 7/2011 | Hughes et al. | 380/44 |
| 2011/0225417 A1* | 9/2011 | Maharajh et al. | 713/150 |

* cited by examiner

METHOD AND SYSTEM FOR TRANSMITTING DEFERRED MEDIA INFORMATION IN AN IP MULTIMEDIA SUBSYSTEM

CROSS-REFERENCE TO RELATED APPLICATIONS

This application is a National Phase Application of PCT International Patent Application No. PCT/CN2010/071186, International Filing Date Mar. 22, 2010, claiming priority of Chinese Patent Application No. 200910142257.X filed Jun. 26, 2009, both of which are incorporated herein by reference.

FIELD OF THE INVENTION

The present invention relates to the communication field, and in particular to a method and system for transmitting the deferred media information in an Internet Protocol (IP) Multimedia Subsystem.

BACKGROUND OF THE INVENTION

Requirements of sending deferred media information to the media mailbox of the receiving party are proposed in the media security technology of the IP Multimedia Subsystem (IMS). This situation generally happens when the sending party (user A) sends the media information to the receiving party (user B), and user B is in an offline state (There are many causes which can result in the offline of user B, such as user B is shut down, user B does not log in, user B is out of the service area, etc). In this situation, because of user B's unavailability, the key negotiation mechanism which requires that both parties are online can not be used, and a Key Management Server (KMS) as a trusted third party must be introduced to realize that the communicating parties can obtain the shared media key through an asynchronous mode.

At present, as for the secure sending of the deferred media information, there are two solutions in the technical documents related to the media security of the IP Multimedia Subsystem (IMS): one is based on a Ticket-based System (TBS), and the other is based on the Otway Rees protocol (it is an authentication and code exchange protocol). However, both of the two prior arts have defects, which will be described respectively hereinafter in detail.

FIG. 1 is a schematic diagram of a framework of the solutions to the media plane security in the IMS based on the TBS and the Otway Rees protocol in the prior art, wherein user A (UE-A) and user B (UE-B) are the sending party and the receiving party of the media information respectively;

the Key Management Server (KMS) is a trusted third party performing the key management and distribution function;

P-CSCF (Proxy-Calling Session Control Function) and S-CSCF (Service-Calling Session Control Function) are network elements of the IMS; and functions of other network elements in FIG. 1 are not described in detail herein. Please refer to other related documents.

FIG. 2 is a flowchart of a method for establishing a media channel between the calling party (user A) and the called party (user B) based on the framework shown in FIG. 1. As shown in FIG. 2, the following steps need to be performed to establish the secure media channel between user A and user B, and to send the media information through the media channel.

Step 201, user A and user B respectively establish a secured connection with the KMS in a Generic Bootstrapping Architecture (GBA) mode.

In the case that GBA cannot be used, user A and user B can establish a secured connection with the KMS based on other authentication methods, such as pre-established security association, etc.

Step 202, user A sends a request for applying a media master key and a ticket to the KMS.

Step 203, the KMS generates the media master key and the ticket, and returns the media master key and the ticket to user A.

Step 204, user A sends an INVITE message which comprises the ticket to user B through the IMS network.

Step 205, after receiving the INVITE message which comprises the ticket, the IMS network sends the INVITE message to user B, wherein the authorized elements in the IMS network can send the ticket to the KMS to obtain the media master key.

Step 206, after receiving the INVITE message, user B sends the ticket comprised in the INVITE message to the KMS to obtain the media master key.

Step 207, the KMS verifies the identity of user B. After the verification is approved, the KMS takes out the media master key and sends the media master key to user B.

Step 208, user B successfully accepts the calling request from user A.

The above mentioned is the process when the called party (user B) is in the online state. When user B is offline, which means that it is under the circumstance of sending deferred media information, no detailed implementation method is given in any relevant documents. Only a schematic diagram of a framework of a deferred media information security solution in the IMS as shown in FIG. 3 and a brief introduction are provided in the prior arts. The brief introduction is as follows.

User A first sends the ticket to the mailbox server of user B through INVITE message, and then user A sends the media information to the mailbox server of user B. When user B logs in, user B obtains the ticket from the mailbox server, and then sends the ticket to the KMS. Next, the KMS sends the media master key to user B.

To sum up, the sending of deferred media information can be realized through the TBS, while the implementation method is relatively complicated, that is no matter whether user B logs in, user A and user B both need to interact with the KMS.

Compared with the solution based on the TBS, the solution based on the Otway Rees protocol of the media security in the IMS uses similar network framework and reduces the signaling interaction with the KMS. But, because the media master key may be repeatedly used in the solution based on the Otway Rees protocol, the KMS needs to store the generated media master key, which will cause a problem of the statefulness of the KMS (namely, the problem that the KMS can not afford the excessive storage requirement). Other defect of the solution based on the Otway Rees protocol is that if the shared key between the sending party and the KMS is expired, after logs in the receiving party obtains the information encrypted with the expired key and forwards this information to the KMS, then the KMS can not decrypt the encrypted information. Therefore, the KMS can not regenerates the media master key according to the information in this situation. As a result the receiving party can not obtain the media master key, and can not decrypt the encrypted media information to obtain the media information.

SUMMARY OF THE INVENTION

The present invention overcomes the defects in the prior art by providing a method and a system for transmitting deferred media information in the IP Multimedia Subsystem, with the result that the KMS does not need to store and maintain the generated media master key.

In order to solve the above-mentioned problem, the present invention provides a method for transmitting deferred media information in the IP Multimedia Subsystem. This method comprises:

a sending party of the media information sending key generation parameters encrypted by using a Ka to a mailbox server of a receiving party of the media information; the mailbox server saving the encrypted key generation parameters, and sending the encrypted key generation parameters to a Key Management Server (KMS); wherein the Ka is a shared key of the sending party and the KMS;

the KMS obtaining key generation parameters through decryption using the corresponding Ka, generating the media key K with the key generated parameters, and forwarding the K to the sending party through the mailbox server of the receiving party;

the receiving party obtaining the encrypted key generation parameters from the mailbox server, and then sending the obtained encrypted key generation parameters to the KMS;

the KMS obtaining the key generation parameters by using the Ka to decrypt the encrypted key generation parameters sent by the receiving party, and then generating the K with the key generation parameters and sending the K to the receiving party; and the receiving party obtaining the media information encrypted by the sending party with the K from the mailbox server, and then decrypting the encrypted media information by using the K.

In addition, before the K is sent to the sending party, the KMS also encrypting the Ka by using a private key Kkms, and then sending the encrypted Ka to the mailbox server to be saved;

when the receiving party obtains the encrypted key generation parameters from the mailbox server, the mailbox server also sending the encrypted Ka to the receiving party; when the receiving party sends the encrypted key generation parameters to the KMS, the receiving party also sending the encrypted Ka to the KMS; and after receiving the encrypted Ka, the KMS obtaining the Ka through decryption using the Kkms.

In addition, in the step that the encrypted key generation parameters are sent to the KMS, the sending party sends the encrypted key generation parameters to the KMS in the following steps: the sending party sending the encrypted generation parameters within the calling request message to the mailbox server; the mailbox server saving the encrypted key generation parameters, and then sending the media key obtaining request message which comprises the encrypted key generation parameters to the KMS; and before the step that the media key K is generated with the key generation parameters, the method further comprises the step: the KMS verifying the identifier of the sending party, the identifier of the receiving party and the identifier of the mailbox server, and the K to be generated, only after all the verifications are approved.

In addition, in the step that the K is forwarded to the sending party through the mailbox server of the receiving party, the KMS sends the K to the sending party in the following steps:

the KMS encrypting the generated K with the Ka, and then sending the encrypted K to the mailbox server;

the mailbox server sending the encrypted K within the calling response message to the sending party; and the method further comprises the step that the sending party obtains the K through decryption using the Ka.

In addition, in the step that the K is sent to the receiving party, the KMS sends the K to the receiving party in the following steps:

the KMS encrypting the generated K with a key Kb shared with the receiving party, and then sending the encrypted K to the receiving party, and the method further comprises the step that the receiving party obtains the K through decryption using the Kb.

In addition, the encrypted key generation parameters comprise a random number generated by the sending party and/or a time quantum.

In addition, the calling request message comprises: plain texts of the identifier of the sending party and the identifier of the receiving party, and cipher text of the identifier of the sending party and the identifier of the receiving party encrypted with the Ka; and the media key obtaining request message comprises: plain texts of the identifier of the sending party and the identifier of the receiving party, cipher texts of the identifier of the sending party and the identifier of the receiving party encrypted with the Ka, and cipher texts of the identifier of the sending party and the identifier of the mailbox server encrypted with a key Km shared by the mailbox server and the KMS; and in the verification step, the KMS verifies the identifier of the sending party, the identifier of the receiving party and the identifier of the mailbox server in the following steps: verifying whether the identifier of the sending party obtained through decryption is identical with the plain text of the identifier of the sending party; verifying whether the identifier of the receiving party obtained through decryption is identical with the plaintext of the identifier of the receiving party; and verifying whether the identifier of the mailbox server obtained through decryption is identical with the identifier of the mailbox server corresponding to the identifier of the receiving party.

The present invention also provides a system for transmitting deferred media information in an IP Multimedia Subsystem, and the system comprises a sending party of media information, a receiving party of the media information, a Key Management Server (KMS) and a mailbox server of the receiving party of the media information, wherein the sending party is configured to send key generation parameters encrypted with a Ka to the mailbox server; the mailbox server saves the encrypted key generation parameters, and then sends the encrypted key generation parameters to the KMS, wherein the Ka is a shared key of the sending party and the KMS;

the KMS is configured to obtain the key generation parameters by using the corresponding Ka to decrypt, to generate a media key K with the decrypted key generation parameters, and to send the K to the sending party;

the receiving party is configured to obtain the encrypted key generation parameters from the mailbox server, and then to send the obtained encrypted key generation parameters to the KMS;

after receiving the encrypted key generation parameters sent by the receiving party, the KMS is further configured to obtain the key generation parameters by using the Ka to decrypt the encrypted key generation parameters, to generate the K with the decrypted key generation parameters and send the K to the receiving party; and the receiving party is further configured to obtain the media information encrypted by the sending party with the K from the mailbox server, and then to decrypt the encrypted media information by using the K.

In addition, before the K is sent to the sending party, the KMS is further configured to encrypt the Ka by using the private key Kkms, and then to send the encrypted Ka to the mailbox server to be saved;

when the receiving party obtains the encrypted key generation parameters from the mailbox server, the mailbox server is further configured to send the encrypted Ka to the receiving party, and the receiving party is further configured to send the encrypted Ka and the encrypted key generation parameters to the KMS; and after receiving the encrypted Ka, the KMS is further configured to obtain the Ka through decryption using the Kkms.

In addition, the sending party is further configured to generate a random number and/or a timestamp and to encrypt the generated random number and/or the timestamp by using the Ka, and then to send the encrypted generated random number and/or the timestamp to the KMS through the mailbox server as the encrypted key generation parameters.

The present invention also provides a sending terminal for transmitting deferred media information in an IP Multimedia Subsystem.

The sending terminal is configured to send key generation parameters encrypted with a Ka to a mailbox server of a receiving party, so that the mailbox server can save the encrypted key generation parameters and send the key generation parameters to a Key Management Server (KMS);

the sending terminal is further configured to receive a media key K sent by the KMS through the mailbox server of the receiving terminal, wherein the K is the media key generated with the key generation parameters which the KMS obtains by using the corresponding Ka to decrypt the received encrypted key generation parameters; the Ka is the shared key of the sending terminal and the KMS; and the sending terminal is further configured to encrypt the media information with the K to transmit the media information.

In addition, the sending terminal is further configured to generate a random number and/or a timestamp and to encrypt the generated random number and/or the timestamp by using the Ka, and then to send the encrypted generated random number and/or the timestamp to the KMS through the mailbox server as the encrypted key generation parameters.

The present invention also provides a Key Management Server (KMS) for transmitting deferred media information in an IP Multimedia Subsystem, wherein the KMS is configured to:

receive encrypted key generation parameters sent by a mailbox server of a receiving party, wherein the encrypted key generation parameters are encrypted with a Ka and sent by a sending terminal to the mailbox server to be saved on the mailbox server;

obtain the key generation parameters by using the corresponding Ka to decrypt; generate a media key K with the decrypted key generation parameters, and send the K to the sending terminal through the mailbox server of the receiving terminal; the Ka is the shared key of the sending terminal and the KMS;

receive the encrypted key generation parameters sent by the receiving terminal, and the encrypted key generation parameters are obtained by the receiving terminal from the mailbox server; and obtain the key generation parameters by using the Ka to decrypt the encrypted key generation parameters received from the receiving terminal, and generate the K with the key generation parameters, and send the K to the receiving terminal.

In addition, the KMS is further configured to encrypt the Ka by using a private key Kkms, then to send the encrypted Ka to the mailbox server to be saved on the server; and the KMS is further configured to receive the encrypted Ka sent by the receiving terminal, wherein the encrypted Ka is sent to the receiving terminal through the mailbox server, while the receiving terminal sending the encrypted key generation parameters to the KMS.

In addition, the KMS is further configured to encrypt the generated K by using a key Kb shared with the receiving terminal before sending the K to the receiving terminal, and then to send the encrypted K to the receiving terminal.

In addition, the KMS is further configured to verify the identifier of the sending party, the identifier of the receiving party and the identifier of the mailbox server, and the K will be generated only after the verification is approved.

The present invention also provides a receiving terminal for transmitting deferred media information in an IP Multimedia Subsystem.

the receiving terminal is configured to:

obtain encrypted key generation parameters encrypted with a key Ka from a mailbox server, which a sending terminal sends to the mailbox server, wherein the Ka is the shared key of the sending terminal and a Key Management Server (KMS);

send the obtained encrypted key generation parameters to the KMS;

receive a key K, wherein the K is sent by the KMS and generated with the key generation parameters which the KMS obtains by using the Ka to decrypt the encrypted key generation parameters after receiving the encrypted key generation parameters sent by the receiving terminal; and obtain the media information encrypted by the sending terminal with the K from the mailbox server, and then decrypt the encrypted media information by using the K.

In addition, the receiving terminal is further configured to obtain the K by using a key Kb shared with the KMS, and before the K is sent to the receiving terminal, the KMS is further configured to encrypt the generated K by using the Kb.

To sum up, compared with the prior art, after the shared key is obtained, the present invention decreases the signaling interaction between the sending party of the media information and the KMS, reduces the storage pressure of the KMS, solves the problem caused by the expiration of the shared key between the sending party of the media information and the KMS, and realizes the secure sending of the deferred media information in the IMS.

DETAILED DESCRIPTION OF EMBODIMENTS

The core idea of the present invention is that:

the sending party of media information sends the key generation parameters (which can be a random number) encrypted by a key Ka shared with the KMS to the mailbox server of the receiving party of media information, the mailbox server saves the key generation parameters and sends the key generation parameters to the KMS;

the KMS obtains the key generation parameters by using the Ka to decrypt, generates a media key K by using the key generation parameters, and sends the media key K to the sending party of media information; after receiving the media key K, the sending party of media information encrypts the media information by using the media key K, and sends the encrypted media information to the mailbox server of the receiving party of media information; and after the receiving party of media information is online, the receiving party obtains the key generation parameters saved in the mailbox server, and sends the key generation parameters to the KMS; the KMS obtains the key generation parameters through the Ka decryption, and regenerates the media key K by using the key generation parameters, and sends the media key K to the receiving party of the media information; the receiving party of the media information decrypts the encrypted media information received by the mailbox server through the media key K decryption.

The present invention will be described in detail hereinafter in connection with the embodiments and drawings of the present invention.

Figure 1:
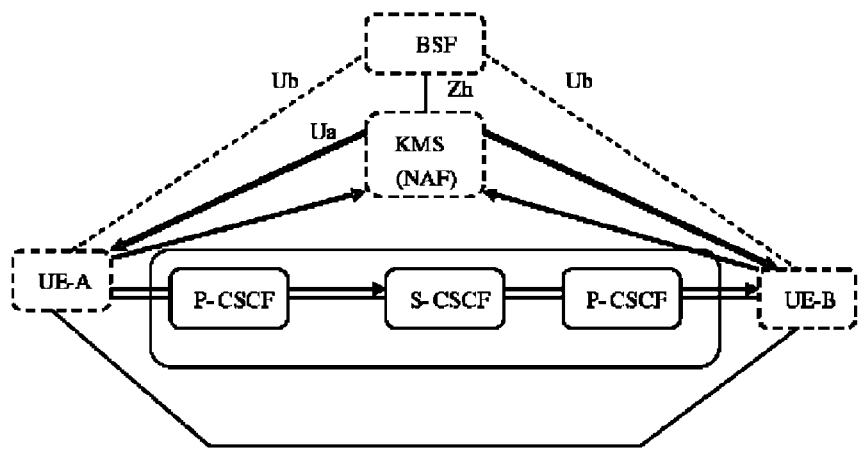
FIG. 1 is a schematic diagram of a framework of the solutions based on the TBS and the Otway Rees protocol to the media security in the IMS in the prior art.
Figure 2:
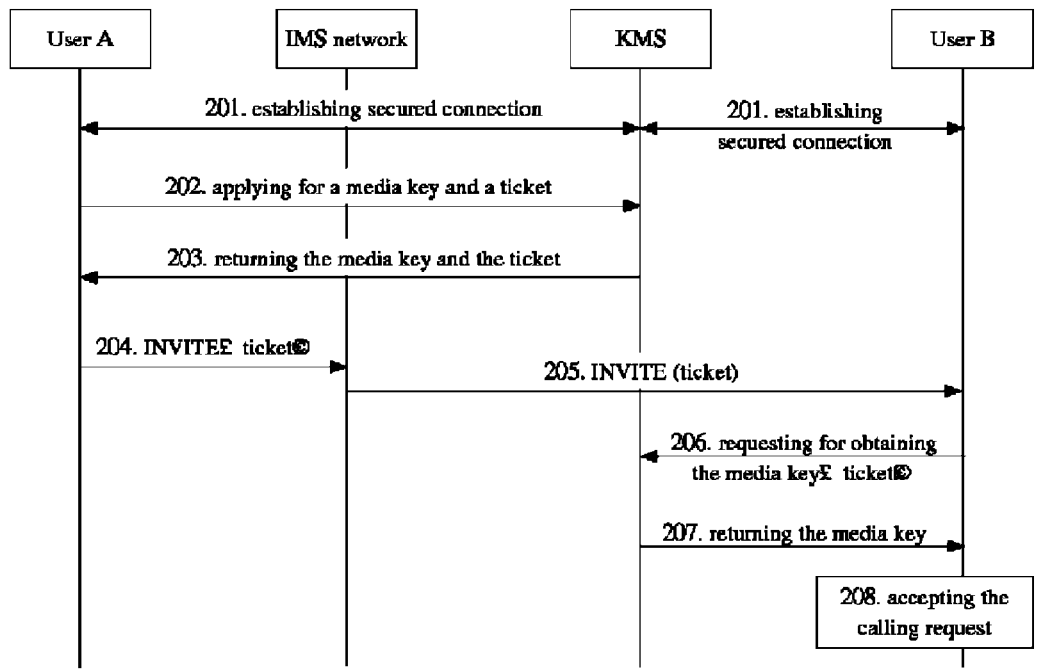
FIG. 2 is a flowchart of a method for establishing a media channel between the calling party and the called party based on the framework shown in FIG. 1.
Figure 3:
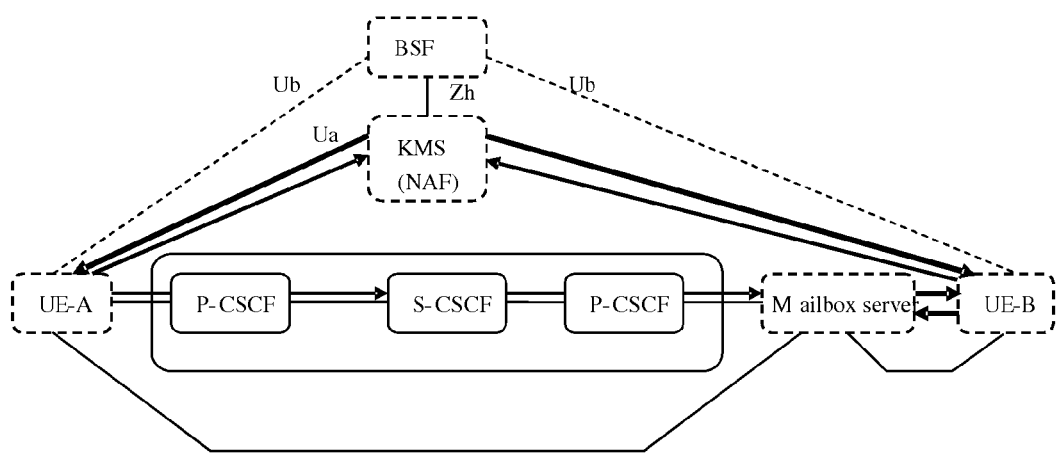
FIG. 3 is a schematic diagram of a framework of a solution to the deferred media information security in the IMS in the prior art.
Figure 4:
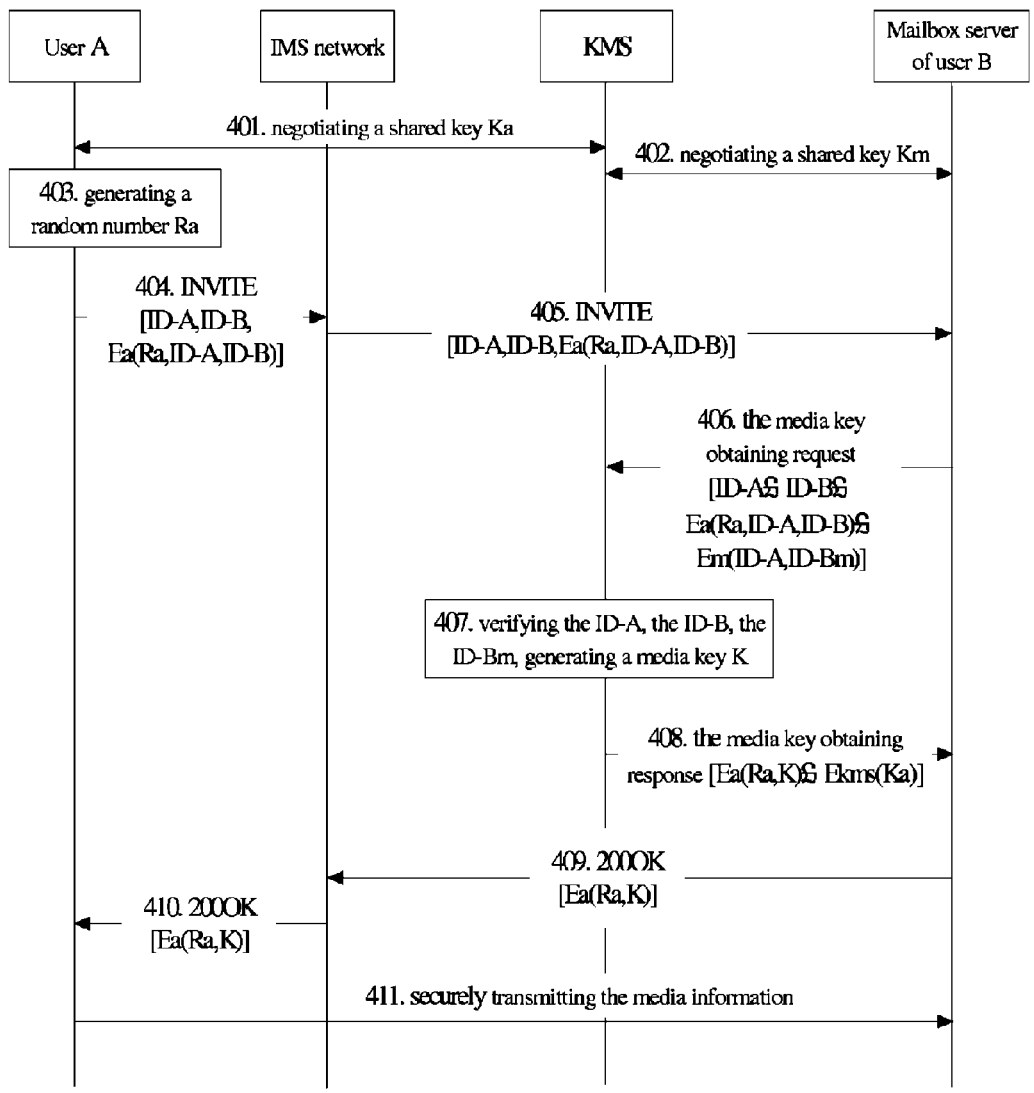
FIG. 4 is a flowchart of a method for negotiating a key between the sending party of deferred media information and the mailbox server of the receiving party of deferred media information based on the KMS according to the embodiment of the present invention.

FIG. 4 is a flowchart of a method for negotiating a key between the sending party (user A) of deferred media information and the mailbox server of the receiving party (user B) of deferred media information based on the KMS according to the embodiment of the present invention; after this process is ended, user A and the mailbox server of user B completes the verification of the identities of each other, and only user A obtains the media key K which is used to encrypt the media information. As shown in FIG. 4, the method comprises the following steps.

Step 401: user A and the Key Management Server (KMS) obtain the shared key Ka by using the General Bootstrapping Architecture (GBA) negotiation.

In case the GBA mode is not available, user A can negotiate with the KMS to obtain the shared key Ka in other authentication modes.

Step 402, the mailbox server of user B can negotiate with the KMS to obtain the shared key Km by employing GBA, Transport Layer Security (TLS), Internet Protocol Security (IPSec), etc.

The sequence of step 401 and Step 402 is not fixed, and can be overturned.

Step 403, user A generates a random number Ra.

Step 404, user A sends a calling request (such as a INVITE message) to user B through the IMS network, and the calling request comprises the following parameters: the ID-A (the identifier of user A), the ID-B (the identifier of user B) and the Ea (Ra, ID-A, ID-B), wherein the Ea (Ra, ID-A, ID-B) is the encrypted text of the random number Ra, the ID-A and the ID-B by using the shared key Ka.

Step 405, the IMS network forwards the calling request of user A to the mailbox server of user B.

Step 406, after receiving the calling request of user A, the mailbox server of user B sends the media key obtaining request to the KMS, and the request comprises the following parameters of the ID-A, the ID-B, the Ea (Ra, ID-A, ID-B) and the Em (ID-A, ID-Bm), wherein the ID-Bm is the identifier of the mailbox server of user B, and the Em (ID-A, ID-Bm) is the encrypted text of the ID-A and the ID-Bm by using the shared key Km.

Step 407, the KMS uses Ka to decrypt Ea (Ra, ID-A, ID-B), and verifies whether the obtained ID-A and ID-B through decryption are identical with the plain texts of the ID-A and the ID-B; the KMS uses Km to decrypt Em (ID-A, ID-Bm), and verifies whether the obtained ID-A through decryption is identical with the plaintext of the ID-A and whether the ID-Bm is the identifier of the mailbox server corresponding to the ID-B; in case that all the verifications are successful (that is to say, the obtained ID-A and ID-B through decryption are identical with the plain texts of the ID-A and the ID-B, and the ID-Bm is the identifier of the mailbox server corresponding to the ID-B), the obtained random number Ra and the ID-A through decryption are used to generate the media key K by using the media Key Derivation Function (KDF).

Step 408, the KMS obtains the Ea (Ra, K) by encrypting the random number Ra and the media key K by using the Ka, and obtains the Ekms (Ka) by encrypting the Ka with the private key Kkms, and sends Ea (Ra, K) and Ekms (Ka) within the media key obtaining response message to the mailbox server of user B;

after the Ekms (Ka) is sent to the mailbox server of user B, the KMS can delete the Ka.

Step 409, after receiving the Ea (Ra, K) and the Ekms (Ka), the mailbox server of user B sends a calling response message (such as 200 OK message) which comprises the Ea (Ra, K) to user A through the IMS network, and stores the Ekms (Ka) together with the preciously received the ID-A, the ID-B and the Ea (Ra, ID-A, ID-B).

Step 410, the IMS network sends the 200 OK message comprising the Ea (Ra, K) to user A, and user A obtains the media key K through decrypting the Ea (Ra, K).

Step 411, after obtaining the media key K, user A can securely sends the media information to the mailbox server of user B by using the media key K. Since the mailbox server of user B can not obtain the media key K, the security of the end-to-end transmission is ensured.

Figure 5:
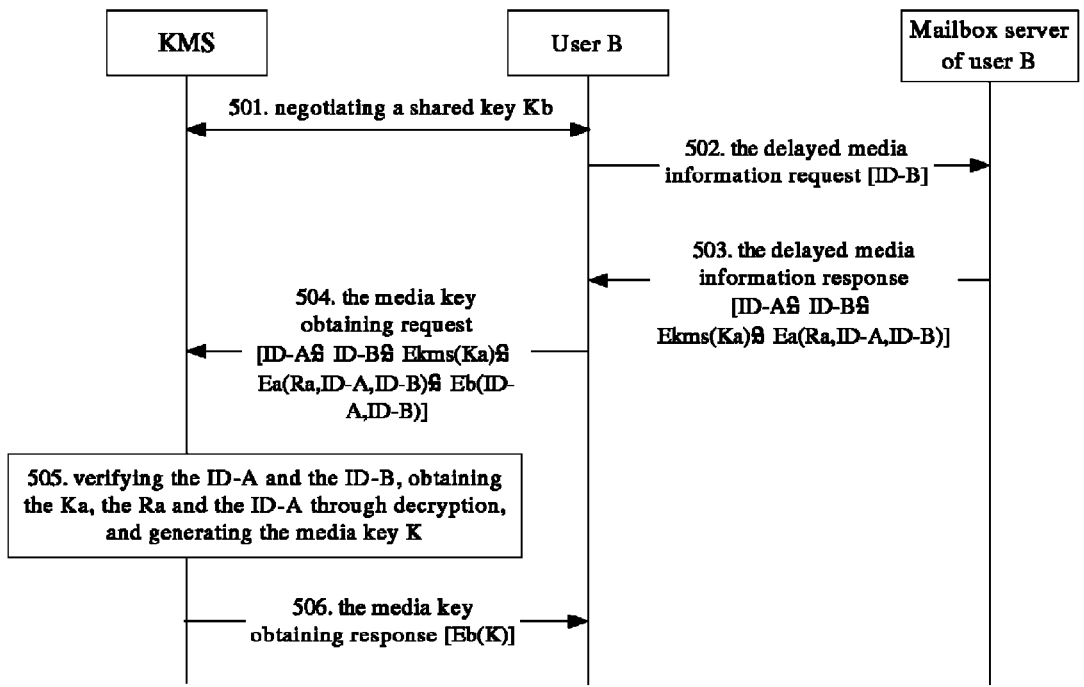
FIG. 5 is a flowchart of a method for obtaining the media key through the receiving party (user B) of deferred media information interacting with the mailbox server of the receiving party of the deferred media information and the KMS according to the embodiment of the present invention.

FIG. 5 is a flowchart of a method for obtaining the media key through the receiving party (user B) of the deferred media information interacting with the mailbox server of the receiving party of the deferred media information and the KMS according to the embodiment of the present invention. After the process is ended, user B obtains the media key K; as shown in FIG. 5, the method comprises the following steps.

Step 501, user B and the Key Management Server (KMS) obtain the shared key Kb by using the General Bootstrapping Architecture (GBA) negotiation.

In case the GBA mode is not available, user B can negotiate with the KMS to obtain the shared key Kb in other authentication modes.

Step 502, user B sends the deferred media information request to the mailbox server, and the request comprises the ID-B which is the identifier of user B.

Step 503, the mailbox server returns the deferred media information response to user B, and the response comprises the following parameters: the ID-A, the ID-B, the Ekms (Ka) and Ea (Ra, ID-A, ID-B).

Step 504, user B sends the media key obtaining request to the KMS, and the request comprises the following parameters: the ID-A, the ID-B, the Ea (Ra, ID-A, ID-B), Ekms (Ka) and Eb (ID-A, ID-B), wherein the Eb (ID-A, ID-B) is the encrypted text of the ID-A and the ID-B by using the shared key Kb.

Step 505, the KMS obtains the Ka by using Kkms to decrypt the Ekms (Ka); the KMS uses the Ka and the Kb respectively decrypt the Ea (Ra, ID-A, ID-B) and the Eb (ID-A, ID-B), and verifies whether the obtained ID-A and ID-B through decryption are identical with the plain texts of the ID-A and the ID-B; in case that all the verification is successful (that is to say, obtained the ID-A and the ID-B through decryption are identical with the plain texts of the ID-A and the ID-B), the KMS uses the obtained random number Ra and the ID-A through decryption to generate the media key K by using the media Key Derivation Function (KDF).

Step 506, the KMS obtains the Eb (K) by encrypting the media key K with the Kb, and sends the media key obtaining response which comprises the Eb (K) to user B.

Thus, user B can obtain the media key K through decrypting the Eb (K), and decrypts the encrypted media information obtained from the mailbox server by using the media key K, therefore the security of the end-to-end transmission is realized.

According to the basic principle of the present invention, the above-mentioned embodiment can have various substitutes, such as:

I. In the above-mentioned embodiment, after encrypting the shared key Ka with the Kkms, the KMS sends the encrypted shared key Ka to the mailbox server of user B; the shared key Ka is obtained by user B and is returned to the KMS, and the KMS obtains the Ka by using the Kkms to decrypt. In other embodiments of the present invention, the KMS can store the shared key Ka. Certainly, when this technical scheme is used, the KMS needs to store and maintain the shared key Ka, which increases the storage and the processing loads of the KMS.

II. In the above-mentioned embodiment, the KMS takes the random number Ra and the ID-A generated by user A as the key generation parameters (wherein the random number Ra is transmitted in the encryption mode and is stored in the mailbox server of user B), at the same time, the random number Ra is also taken as the parameter of preventing replay attack. In other embodiments of the present invention, other parameters generated by the user or the random number Ra together with other parameters can be used as the key generation parameters. Certainly, in order to ensure the secure transmission and storage of the key generation parameters, at least one of the key generation parameters needs to be encrypted with the Ka, and the parameter generally is the random number generated by user A and/or other parameters with the property of the random number (such as the timestamp, etc.).

III. In the above-mentioned embodiment, after generating the media key K, the KMS encrypts the media key K respectively by using the keys shared with user B and user A, and sends the encrypted media key to user A and user B respectively. In other embodiments of the present invention, the KMS can send the media key K in other security modes.

Figure 6:
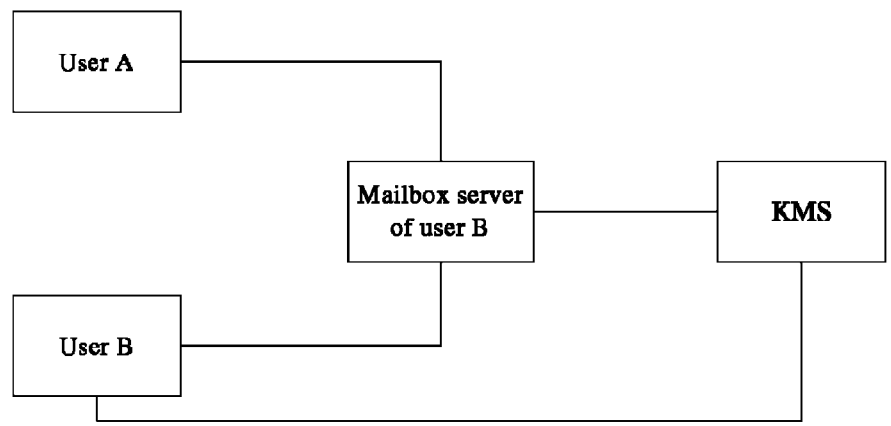
FIG. 6 is a schematic diagram of a system structure for transmitting deferred media information in the IP Multimedia Subsystem according to the embodiment of the present invention.

FIG. 6 is a schematic diagram of a system structure for transmitting deferred media information in the IP Multimedia Subsystem; the system comprises a sending party of media information (user A), a receiving party of media information (user B), a KMS and a mailbox server of user B; wherein:

user A is configured to send the key generation parameters to the mailbox server, and the mailbox server is configured to save the key generation parameters and send the key generation parameters to the KMS;

the KMS is configured to decrypt the key generation parameters by using the Ka which is saved by the KMS, and to generate a media key K with the decrypted key generation parameters, and then send the K to user A, wherein the Ka is the shared key of user A and the KMS;

user B is configured to obtain the key generation parameters from the mailbox server and then to send the obtained key generation parameters to the KMS;

after receiving the key generation parameters sent by user B, the KMS is also configured to decrypt the parameters encrypted by using Ka in the key generation parameters by using Ka, and generate the K with the decrypted key generation parameters, and then to send the K to user B; and user B is also configured to obtain the media information encrypted by user A using the K from the mailbox server and then to decrypt the encrypted media information by using K.

The concrete functions of each above-mentioned network element and the message interactive relationship between the network elements refer to the description of the method embodiment shown in FIG. 4 and FIG. 5.

The present invention also provides a sending terminal for transmitting deferred media information in an IP Multimedia Subsystem.

The sending terminal is configured to send key generation parameters encrypted with a Ka to a mailbox server of a receiving party, so that the mailbox server can save the encrypted key generation parameters and send the key generation parameters to a Key Management Server (KMS);

the sending terminal is further configured to receive a media key K sent by the KMS through the mailbox server of the receiving terminal, wherein the K is the media key generated with the key generation parameters which the KMS obtains by using the corresponding Ka to decrypt the received encrypted key generation parameters; the Ka is the shared key of the sending terminal and the KMS; and the sending terminal is further configured to encrypt the media information with the K to transmit the media information.

In addition, the sending terminal is further configured to generate a random number and/or a timestamp, then to encrypt the generated random number and/or the timestamp by using the Ka, and then to send the encrypted generated random number and/or the timestamp to the KMS through the mailbox server as the encrypted key generation parameters.

The present invention also provides a Key Management Server (KMS) for transmitting deferred media information in an IP Multimedia Subsystem, wherein the KMS is configured to:

receive encrypted key generation parameters sent by a mailbox server of a receiving party, wherein the encrypted key generation parameters are encrypted with a Ka and sent by a sending terminal to the mailbox server to be saved on the mailbox server;

obtain the key generation parameters by using the corresponding Ka to decrypt; generate a media key K with the decrypted key generation parameters, and send the K to the sending terminal through the mailbox server of the receiving terminal; the Ka is the shared key of the sending terminal and the KMS;

receive the encrypted key generation parameters sent by the receiving terminal, and the encrypted key generation parameters are obtained by the receiving terminal from the mailbox server; and obtain the key generation parameters by using the Ka to decrypt the encrypted key generation parameters received from the receiving terminal, and generate the K with the key generation parameters, and send the K to the receiving terminal.

In addition, the KMS is further configured to encrypt the Ka by using a private key Kkms, then to send the encrypted Ka to the mailbox server to be saved on the server; and the KMS is further configured to receive the encrypted Ka sent by the receiving terminal, wherein the encrypted Ka is sent to the receiving terminal through the mailbox server, while the receiving terminal sending the encrypted key generation parameters to the KMS.

In addition, the KMS is further configured to encrypt the generated K by using a key Kb shared with the receiving terminal before sending the K to the receiving terminal, and then to send the encrypted K to the receiving terminal.

In addition, the KMS is further configured to verify the identifier of the sending party, the identifier of the receiving party and the identifier of the mailbox server, and the K will be generated only after the verification is approved.

The present invention also provides a receiving terminal for transmitting deferred media information in an IP Multimedia Subsystem.

the receiving terminal is configured to:

obtain encrypted key generation parameters encrypted with a key Ka from a mailbox server, which a sending terminal sends to the mailbox server, wherein the Ka is the shared key of the sending terminal and a Key Management Server (KMS);

send the obtained encrypted key generation parameters to the KMS;

receive a key K, wherein the K is sent by the KMS and generated with the key generation parameters which the KMS obtains by using the Ka to decrypt the encrypted key generation parameters after receiving the encrypted key generation parameters sent by the receiving terminal; and obtain the media information encrypted by the sending terminal with the K from the mailbox server, and then decrypt the encrypted media information by using the K.

In addition, the receiving terminal is further configured to obtain the K by using a key Kb shared with the KMS, and before the K is sent to the receiving terminal, the KMS is further configured to encrypt the generated K by using the Kb.

Industrial Applicability

Compared with the prior art, after obtaining the shared key, the present invention decreases the signaling interaction between the sending party of media information and the KMS, reduces the storage pressure of the KMS, solves the problem caused by the expiration of the shared key between the sending party of media information and the KMS, and realizes the secure sending of deferred media information in the IMS.

What is claimed is:

1. A method for transmitting deferred media information in an IP Multimedia Subsystem, comprising:

a sending party of the media information sending key generation parameters encrypted by using a Ka to a mailbox server of a receiving party of the media information; the mailbox server saving the encrypted key generation parameters, and sending the encrypted key generation parameters to a Key Management Server (KMS), wherein the Ka is a shared key of the sending party and the KMS;

the KMS obtaining the key generation parameters through decryption using the corresponding Ka, generating a media key K with the key generation parameters, and forwarding the K to the sending party through the mailbox server of the receiving party;

the receiving party obtaining the encrypted key generation parameters from the mailbox server, and then sending the obtained encrypted key generation parameters to the KMS;

the KMS obtaining the key generation parameters by using the Ka to decrypt the encrypted key generation parameters sent by the receiving party, and then generating the K with the key generation parameters and sending the K to the receiving party; and the receiving party obtaining the media information encrypted by the sending party with the K from the mailbox server, and then decrypting the encrypted media information by using the K.

2. The method according to claim 1, which further comprises:

before the K is sent to the sending party, the KMS also encrypting the Ka by using a private key Kkms, and then sending the encrypted Ka to the mailbox server to be saved;

when the receiving party obtains the encrypted key generation parameters from the mailbox server, the mailbox server also sending the encrypted Ka to the receiving party; when the receiving party sends the encrypted key generation parameters to the KMS, the receiving party also sending the encrypted Ka to the KMS; and after receiving the encrypted Ka, the KMS obtaining the Ka through decryption using the Kkms.

3. The method according to claim 1, wherein in the step that the encrypted key generation parameters are sent to the KMS, the sending party sends the encrypted key generation parameters to the KMS in the following steps: the sending party sending the encrypted generation parameters within the calling request message to the mailbox server; the mailbox server saving the encrypted key generation parameters, and then sending the media key obtaining request message which comprises the encrypted key generation parameters to the KMS; and before the step that the media key K is generated with the key generation parameters, the method further comprises the step: the KMS verifying the identifier of the sending party, the identifier of the receiving party and the identifier of the mailbox server, and the K to be generated, only after all the verifications are approved.

4. The method according to claim 3, wherein in the step that the K is forwarded to the sending party through the mailbox server of the receiving party, the KMS sends the K to the sending party in the following steps:

the KMS encrypting the generated K with the Ka, and then sending the encrypted K to the mailbox server;

the mailbox server sending the encrypted K within the calling response message to the sending party; and the method further comprises the step that the sending party obtains the K through decryption using the Ka.

5. The method according to claim 1, wherein in the step that the K is sent to the receiving party, the KMS sends the K to the receiving party in the following steps:

the KMS encrypting the generated K with a key Kb shared with the receiving party, and then sending the encrypted K to the receiving party, and the method further comprises the step that the receiving party obtains the K through decryption using the Kb.

6. The method according to claim 1, wherein the encrypted key generation parameters comprise a random number generated by the sending party and/or a timestamp.

7. The method according to claim 3, wherein the calling request message comprises: plain texts of the identifier of the sending party and the identifier of the receiving party, and cipher text of the identifier of the sending party and the identifier of the receiving party encrypted with the Ka; and the media key obtaining request message comprises: plain texts of the identifier of the sending party and the identifier of the receiving party, cipher texts of the identifier of the sending party and the identifier of the receiving party encrypted with the Ka, and cipher texts of the identifier of the sending party and the identifier of the mailbox server encrypted with a key Km shared by the mailbox server and the KMS; and in the verification step, the KMS verifies the identifier of the sending party, the identifier of the receiving party and the identifier of the mailbox server in the following steps: verifying whether the identifier of the sending party obtained through decryption is identical with the plain text of the identifier of the sending party; verifying whether the identifier of the receiving party obtained through decryption is identical with the plaintext of the identifier of the receiving party; and verifying whether the identifier of the mailbox server obtained through decryption is identical with the identifier of the mailbox server corresponding to the identifier of the receiving party.

8. A system for transmitting deferred media information in an IP Multimedia Subsystem, comprising: a memory stored instructions executed by a processor, a sending party of media information, a receiving party of the media information, a Key Management Server (KMS) and a mailbox server of the receiving party of the media information, wherein the sending party is configured to send key generation parameters encrypted with a Ka to the mailbox server, and the mailbox server is configured to save the encrypted key generation parameters and to send the encrypted key generation parameters to the KMS, wherein the Ka is a shared key of the sending party and the KMS;

the KMS is configured to obtain the key generation parameters by using the corresponding Ka to decrypt, to generate a media key K with the decrypted key generation parameters, and to send the K to the sending party;

the receiving party is configured to obtain the encrypted key generation parameters from the mailbox server, and then to send the obtained encrypted key generation parameters to the KMS;

after receiving the encrypted key generation parameters sent by the receiving party, the KMS is further configured to obtain the key generation parameters by using the Ka to decrypt the encrypted key generation parameters, to generate the K with the decrypted key generation parameters and to send the K to the receiving party; and the receiving party is further configured to obtain the media information encrypted by the sending party with the K from the mailbox server, and then to decrypt the encrypted media information by using the K.

9. The system according to claim 8, which further comprises:

before the K is sent to the sending party, the KMS further configured to encrypt the Ka by using the private key Kkms, and then to send the encrypted Ka to the mailbox server to be saved;

when the receiving party obtains the encrypted key generation parameters from the mailbox server, the mailbox server further configured to send the encrypted Ka to the receiving party, and the receiving party further configured to send the encrypted Ka and the encrypted key generation parameters to the KMS; and after receiving the encrypted Ka, the KMS further configured to obtain the Ka through decryption using the Kkms.

10. The system according to claim 8, which further comprises:

the sending party further configured to generate a random number and/or a timestamp and to encrypt the generated random number and/or the timestamp by using the Ka, and then to send the encrypted generated random number and/or the timestamp to the KMS through the mailbox server as the encrypted key generation parameters.

11. A sending terminal for transmitting deferred media information in an IP Multimedia Subsystem, wherein the sending terminal comprises a memory stored instructions executed by a processor and is configured to send key generation parameters encrypted with a Ka to a mailbox server of a receiving party, so that the mailbox server can save the encrypted key generation parameters and send the key generation parameters to a Key Management Server (KMS);

the sending terminal is further configured to receive a media key K sent by the KMS through the mailbox server of the receiving terminal, wherein the K is the media key generated with the key generation parameters which the KMS obtains by using the corresponding Ka to decrypt the received encrypted key generation parameters; the Ka is the shared key of the sending terminal and the KMS; and the sending terminal is further configured to encrypt the media information with the K to transmit the media information.

12. A receiving terminal for transmitting deferred media information in an IP Multimedia Subsystem, wherein the receiving terminal comprises a memory stored instructions executed by a processor and is configured to:

obtain encrypted key generation parameters encrypted with a key Ka from a mailbox server, which a sending terminal sends to the mailbox server, wherein the Ka is the shared key of the sending terminal and a Key Management Server (KMS);

send the obtained encrypted key generation parameters to the KMS;

receive a key K, wherein the K is sent by the KMS and generated with the key generation parameters which the KMS obtains by using the Ka to decrypt the encrypted key generation parameters after receiving the encrypted key generation parameters sent by the receiving terminal; and obtain the media information encrypted by the sending terminal with the K from the mailbox server, and then decrypt the encrypted media information by using the K.

13. The receiving terminal according to claim 12, wherein the receiving terminal is further configured to obtain the K by using a key Kb shared with the KMS, and before the K is sent to the receiving terminal, the KMS is further configured to encrypt the generated K by using the Kb.

14. The method according to claim 2, wherein
in the step that the encrypted key generation parameters are sent to the KMS, the sending party sends the encrypted key generation parameters to the KMS in the following steps: the sending party sending the encrypted generation parameters within the calling request message to the mailbox server; the mailbox server saving the encrypted key generation parameters, and then sending the media key obtaining request message which comprises the encrypted key generation parameters to the KMS; and
before the step that the media key K is generated with the key generation parameters, the method further comprises the step: the KMS verifying the identifier of the sending party, the identifier of the receiving party and the identifier of the mailbox server, and the K to be generated, only after all the verifications are approved.

15. The method according to claim 2, wherein
in the step that the K is sent to the receiving party, the KMS sends the K to the receiving party in the following steps:
the KMS encrypting the generated K with a key Kb shared with the receiving party, and then sending the encrypted K to the receiving party, and
the method further comprises the step that the receiving party obtains the K through decryption using the Kb.

\* \* \* \* \*